United States Patent
Kim et al.

(10) Patent No.: US 10,211,683 B2
(45) Date of Patent: Feb. 19, 2019

(54) METHOD AND APPARATUS FOR AUTHENTICATION IN WIRELESS POWER TRANSMISSION SYSTEM

(71) Applicant: Samsung Electronics Co., Ltd., Suwon-si (KR)

(72) Inventors: Nam Yun Kim, Seoul (KR); Sang Wook Kwon, Seongnam-si (KR); Dong Zo Kim, Yongin-si (KR); Bong Chul Kim, Seoul (KR); Yun Kwon Park, Dongducheon-si (KR); Chi Hyung Ahn, Suwon-si (KR); Byoung Hee Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1195 days.

(21) Appl. No.: 14/337,611

(22) Filed: Jul. 22, 2014

(65) Prior Publication Data

US 2015/0022018 A1 Jan. 22, 2015

(30) Foreign Application Priority Data

Jul. 22, 2013 (KR) ........................ 10-2013-0086338

(51) Int. Cl.
| | |
|---|---|
| *H02J 50/80* | (2016.01) |
| *H02J 5/00* | (2016.01) |
| *H02J 50/12* | (2016.01) |
| *H02J 7/02* | (2016.01) |
| *H02J 50/10* | (2016.01) |
| *H02J 7/00* | (2006.01) |

(52) U.S. Cl.
CPC .............. *H02J 50/80* (2016.02); *H02J 5/005* (2013.01); *H02J 7/025* (2013.01); *H02J 50/10* (2016.02); *H02J 50/12* (2016.02); *H02J 2007/0001* (2013.01)

(58) Field of Classification Search
CPC ..................................................... H02J 50/80
See application file for complete search history.

(56) References Cited

U.S. PATENT DOCUMENTS

| | | | |
|---|---|---|---|
| 9,088,168 B2 * | 7/2015 | Mach ...................... | H02J 5/005 |
| 2006/0113955 A1 | 6/2006 | Nunally | |

(Continued)

FOREIGN PATENT DOCUMENTS

| | | |
|---|---|---|
| KR | 10-2007-0100179 A | 10/2007 |
| KR | 10-0837637 B1 | 6/2008 |

(Continued)

OTHER PUBLICATIONS

Extended European Search Report dated Nov. 22, 2016 in counterpart European Application No. 14828702.2. (8 pages in English).

(Continued)

*Primary Examiner* — Daniel Cavallari
(74) *Attorney, Agent, or Firm* — Sughrue Mion, PLLC

(57) ABSTRACT

An authentication of a power transmitting unit (PTU) includes determining whether an access right to an external device is present in a power receiving unit (PRU) based on identification information of the PRU, and network-connecting the PRU to the external device in response to a result of the determining being that the access right is present in the PRU.

17 Claims, 18 Drawing Sheets

(56) References Cited

U.S. PATENT DOCUMENTS

| | | | |
|---|---|---|---|
| 2010/0173418 A1* | 7/2010 | Zhou | C07K 14/00 |
| | | | 436/86 |
| 2011/0127952 A1 | 6/2011 | Walley et al. | |
| 2011/0142150 A1 | 6/2011 | Anigstein et al. | |
| 2011/0149788 A1 | 6/2011 | Chuang et al. | |
| 2011/0149818 A1 | 6/2011 | Choi et al. | |
| 2011/0154087 A1 | 6/2011 | Craine | |
| 2012/0112692 A1* | 5/2012 | Arai | G06Q 50/06 |
| | | | 320/108 |
| 2012/0173418 A1* | 7/2012 | Beardsmore | G06Q 30/06 |
| | | | 705/40 |
| 2013/0119778 A1 | 5/2013 | Jung | |
| 2016/0006264 A1* | 1/2016 | Alperin | H02J 5/005 |
| | | | 307/104 |
| 2016/0056863 A1* | 2/2016 | Nago | H04B 5/0031 |
| | | | 455/411 |

FOREIGN PATENT DOCUMENTS

| | | |
|---|---|---|
| KR | 10-2011-0029734 A | 3/2011 |
| KR | 10-2012-0068412 A | 6/2012 |

OTHER PUBLICATIONS

International Search Report dated Sep. 30, 2014, in counterpart International Patent Application No. PCT/KR2014/006620 (3 pages, in English).

* cited by examiner

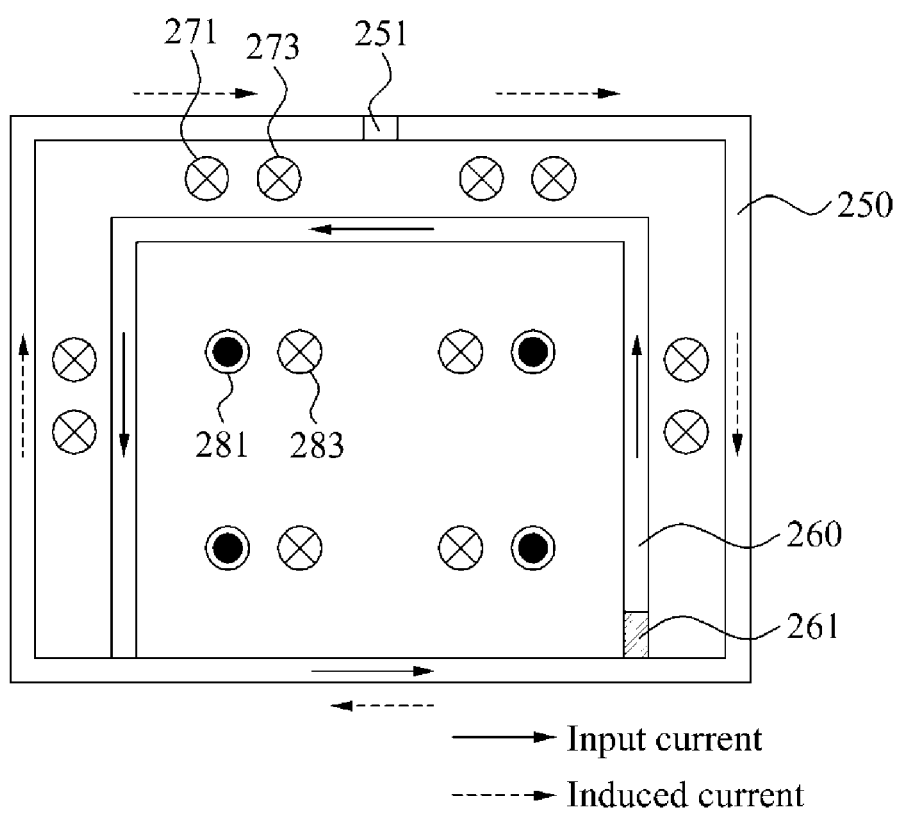

METHOD AND APPARATUS FOR AUTHENTICATION IN WIRELESS POWER TRANSMISSION SYSTEM

CROSS-REFERENCE TO RELATED APPLICATIONS

This application claims the benefit under 35 USC 119(a) of Korean Patent Application No. 10-2013-0086338 filed on Jul. 22, 2013, in the Korean Intellectual Property Office, the entire disclosure of which is incorporated herein by reference for all purposes.

BACKGROUND

1. Field

The following description relates to a method and apparatus for authentication in a wireless power transmission system.

2. Description of Related Art

Wireless power transmission is the transmission of power to a power receiving unit (PRU) from a power transmitting unit (PTU) via magnetic resonant coupling. Accordingly, a wireless power transmission system or a wireless power charging system includes a source device for wirelessly transmitting power and a target device for wirelessly receiving power. The source device may be referred to as a source or a PTU, and the target device may be referred to as a target or a PRU.

The source device includes a source resonator, and the target device includes a target resonator. Magnetic resonance coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an authentication method of a power transmitting unit (PTU) includes determining whether an access right to an external device is present in a power receiving unit (PRU) based on identification information of the PRU; and network-connecting the PRU and the external device in response to a result of the determining being that the access right is present in the PRU.

The authentication method may further include granting the access right to the PRU.

The granting of the access right to the PTU may include transmitting, to the PRU, a setting identifier to which the access right is granted.

The transmitting of the setting identifier to the PRU may include obtaining a unique identifier of the PRU; and generating the setting identifier based on the unique identifier.

The transmitting of the setting identifier may include receiving a request for granting the access right from the PRU; and transmitting the setting identifier to the PRU in response to the request.

The granting of the access right to the PRU may include obtaining a unique identifier of the PRU; and granting the access right to the unique identifier.

The granting of the access right to the PRU may include receiving a setting identifier from the PRU; and granting the access right to the setting identifier in response to the receiving of the setting identifier.

The granting of the access right to the PRU may include receiving, from the external device, a request for granting the access right to the PRU; and granting the access right to the PRU in response to the request.

The granting of the access right to the PRU may include receiving, from the external device, a setting identifier to which the access right is granted.

The determining of whether the access right is present in the PRU may include receiving the identification information from the PRU a predetermined number of times; and blocking further reception of the identification information from the PRU in response to a result of the determining being that the access right is not present in the PRU based on the identification information received the predetermined number of times.

The identification information may include the access right granted by the external device.

The authentication method may further include network-connecting the PTU to the PRU.

The network-connecting of the PTU to the PRU may include transmitting a beacon signal to the PRU; receiving an advertisement signal from the PRU; and transmitting a connection request to the PRU.

The transmitting of the beacon signal to the PRU may include transmitting a wake-up power to the PRU.

The determining of whether the access right is present in the PRU may include receiving either one or both of a unique identifier and a setting identifier from the PRU; and determining whether the access right in is present in the either one or both of the unique identifier and the setting identifier.

The PRU may be configured to communicate directly with the external device while the PRU is network-connected to the external device.

The authentication may further include feeding back, in a visual, audible, or tactile manner, information associated with either one or both of the identification information and the access right of the PRU.

In another general aspect, a non-transitory computer-readable storage medium stores a program for controlling a computer to perform the authentication method described above.

In another general aspect, an authentication method of a power receiving unit (PRU) includes determining whether an access right to an external device is present in a power transmitting unit (PTU) based on identification information of the PTU; and network-connecting the PTU and the external device in response to a result of the determining being that the access right is present in the PTU.

In another general aspect, a power transmitting unit (PTU) includes a resonator configured to transmit wireless power; a power supply circuit configured to supply power to the resonator; and a control and communication unit configured to control the power supply circuit; determine whether a power receiving unit (PRU) is pre-authorized to access an external device based on identification information received from the PRU; and network-connect the PRU and the external device in response to a result of the determining being that the PRU is pre-authorized to access the external device.

The identification information may reflect whether an access right to the external device is present in the PRU.

The control and communication unit may be further configured to compare authentication information included in the PTU to the identification information of the PRU; in response to a result of the comparing being that the authentication information included in the PTU corresponds to the identification information of the PRU, determine that the PRU is pre-authorized to access the external device; and in response to a result of the comparing being that the authentication information included in the PTU does not correspond to the identification information of the PRU, determine that the PRU is not pre-authorized to access the external device.

In another general aspect, a power receiving unit (PRU) includes a resonator configured to receive wireless power; a power converting circuit configured to convert the wireless power received by the resonator and supply the converted power to a load; and a control and communication unit configured to control the power converting circuit; determine whether a power transmitting unit (PTU) is pre-authorized to access an external device based on identification information received from the PTU; and network-connect the PTU and the external device in response to a result of the determining being that the PTU is pre-authorized to access the external device.

The identification information may reflect whether an access right to the external device is present in the PTU.

The control and communication unit may be further configured to compare authentication information included in the PRU to the identification information of the PTU; in response to a result of the comparing being that the authentication information included in the PRU corresponds to the identification information of the PTU, determine that the PTU is pre-authorized to access the external device; and in response to a result of the comparing being that the authentication information included in the PRU does not correspond to the identification information of the PTU, determine that the PTU is not pre-authorized to access the external device.

Other features and aspects will be apparent from the following detailed description, the drawings, and the claims.

BRIEF DESCRIPTION OF THE DRAWINGS

FIGS. 2A and 2B illustrate examples of a distribution of a magnetic field in a resonator and a feeder.

DETAILED DESCRIPTION

Figure 1:
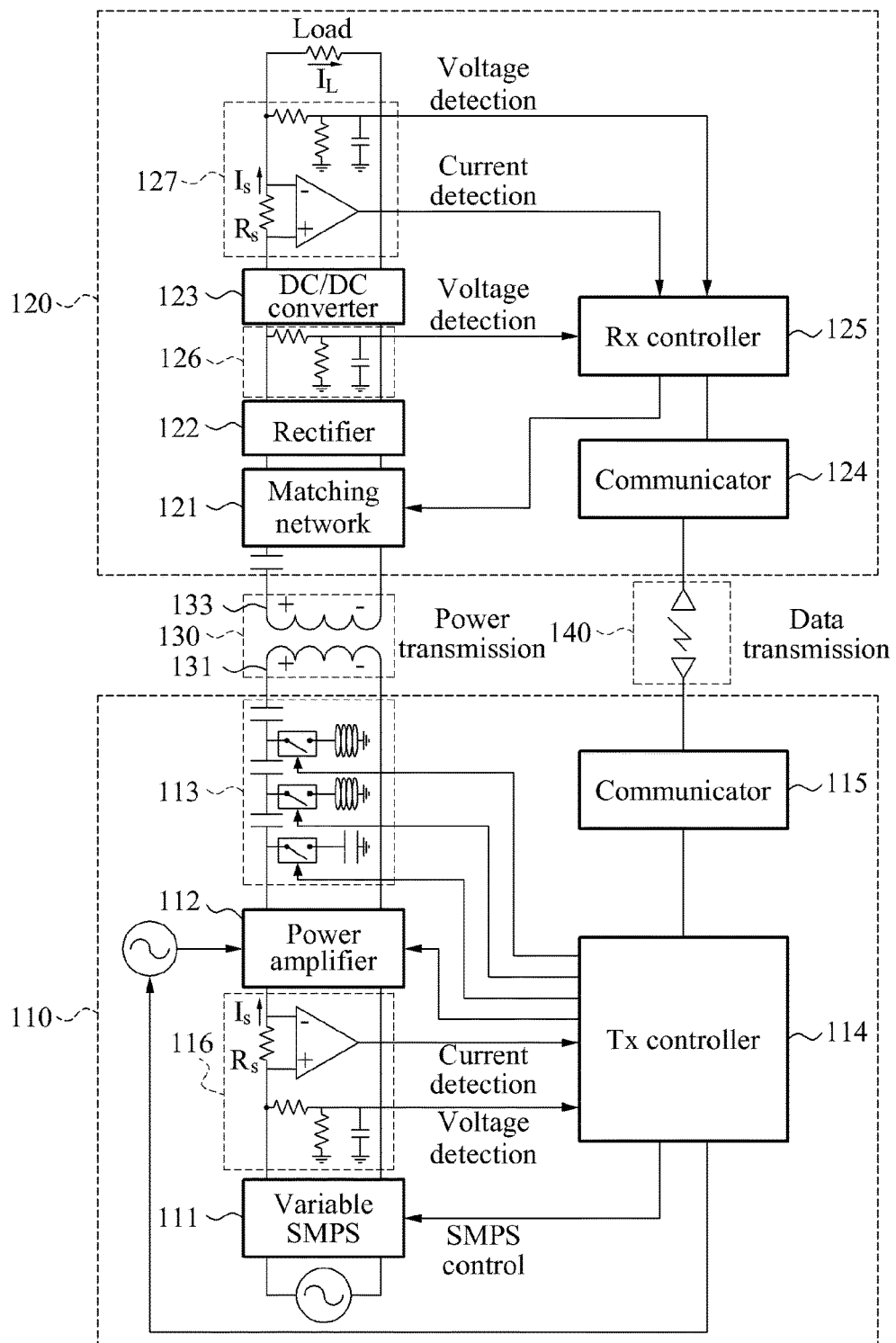
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target or between a source and another source include an in-band communication scheme and an out-of-band communication scheme.

In the in-band communication scheme, a source and a target, or a source and another source, communicate with each other using a frequency that is the same as a frequency used for power transmission.

In the out-of-band communication scheme, a source and a target, or a source and another source, communicate with each other using a frequency that is different from a frequency used for power transmission.

FIG. 1 illustrates an example of a wireless power transmission system.

Referring to FIG. 1, the wireless power transmission system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, TX control logic), a communicator 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be needed. In this example, the fixed SMPS outputs a fixed DC voltage to the variable DC/DC converter, and the variable DC/DC converter controls its output voltage supplied to the PA 112 based on the level of the power output from the PA 112 so that the PA 112 may operate in the saturation region with a high efficiency at all times, thereby enabling the maximum efficiency to be maintained at all levels of the output power of the PA 112.

The power detector 116 detects an output current and an output voltage of the variable SMPS 111, and transmits, to the Tx controller 114, information on the detected output current and the detected output voltage. Also, the power detector 116 may detect an input current and an input voltage of the PA 112.

The PA 112 generates power by converting a DC voltage having a predetermined level supplied to the PA 112 to an AC voltage using a switching pulse signal having a frequency in a band of a few megahertz (MHz) to tens of MHz. For example, the PA 112 may convert a DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is transmitted using a resonant frequency of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. In particular, the inverter may convert the DC power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may include, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a level of an output voltage of the source resonator 131 or the PA 112 and a voltage level of the reflected wave. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N predetermined tracking frequencies, determine a tracking frequency $F_{Best}$ providing the best power wireless transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the Tx controller 114 may transmit a variety of data to the target 120 using in-band communication. The Tx controller 114 may also detect a reflected wave, and demodulate a signal received from the target 120 from an envelope of the detected reflected wave.

The Tx controller 114 may generate a modulated signal for in-band communication using various methods. For example, the Tx controller 114 may generate the modulated signal by turning the switching pulse signal used by the PA 112 on or off, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to sense a change in a temperature of the source 110. The source 110 may receive from the target 120 information regarding the battery state of the target 120, the change in the amount of power received by the target 120, and/or the change in the temperature of the target 120 by communicating with the target 120. The source 110 may detect the change in the temperature of the target 120 based on the data received from the target 120.

The Tx controller 114 may adjust a voltage supplied to the PA 112 using a lookup table (LUT). The LUT may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communicator 115 may perform out-of-band communication using a separate communication channel. The communicator 115 may include a communication module, such as a ZigBee module, a Bluetooth module, or any other communication module known to one of ordinary skill in the art that the communicator 115 may use to transmit and receive data 140 to and from the target 120 using the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. Also, although not shown in FIG. 1, the source resonator 131 may be disposed in a container of refrigerant to enable the source resonator 131 to maintain a superconducting state. A heated refrigerant that has transitioned to a gaseous state may be liquefied to a liquid state by a cooler. The target resonator 133 may also be made of a superconducting material. The target resonator 133 may also be disposed in a container of refrigerant to enable the target resonator 133 to maintain a superconducting state.

As illustrated in FIG. 1, the target 120 includes a matching network 121, a rectifier 122, a DC/DC converter 123, a communicator 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive the data from the source 110 using in-band communication.

The target resonator 133 may receive the initial wireless power determined by the Tx controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. The detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required for the load and the amount of power actually transferred to the load.

If the amount of the power actually transferred to the load calculated by the Rx controller 125 is transmitted to the source 110 by the communicator 125, the Tx controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received using the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the TX controller 114 of the source 110. Depending on whether the reflected wave is detected, the Tx controller 114 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communicator 124 of the target 120 may transmit a response message to the communicator 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communicator 124 may perform out-of-band communication using a separate communication channel. For example, the communicator 124 may include a communication module, such as a ZigBee module, a Bluetooth module, or any other communication module known to one of ordinary skill in the art that the communicator 124 may use to transmit and receive the data 140 to and from the source 110 using the out-of-band communication.

The communicator 124 may receive a wake-up request message from the source 110, and the power detector 127 may detect an amount of power received by the target resonator 133. The communicator 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The source 110 and the target 120 of FIG. 1 may correspond to a wireless power transmission apparatus and a wireless power reception apparatus to be described hereinafter.

In the following description of FIGS. 2A through 4B, unless otherwise indicated, the term "resonator" may refer to both a source resonator and a target resonator. The resonator of FIGS. 2A through 4B may be used as the resonators described with respect to FIGS. 1 and 5 through 12.

Figure 2A:
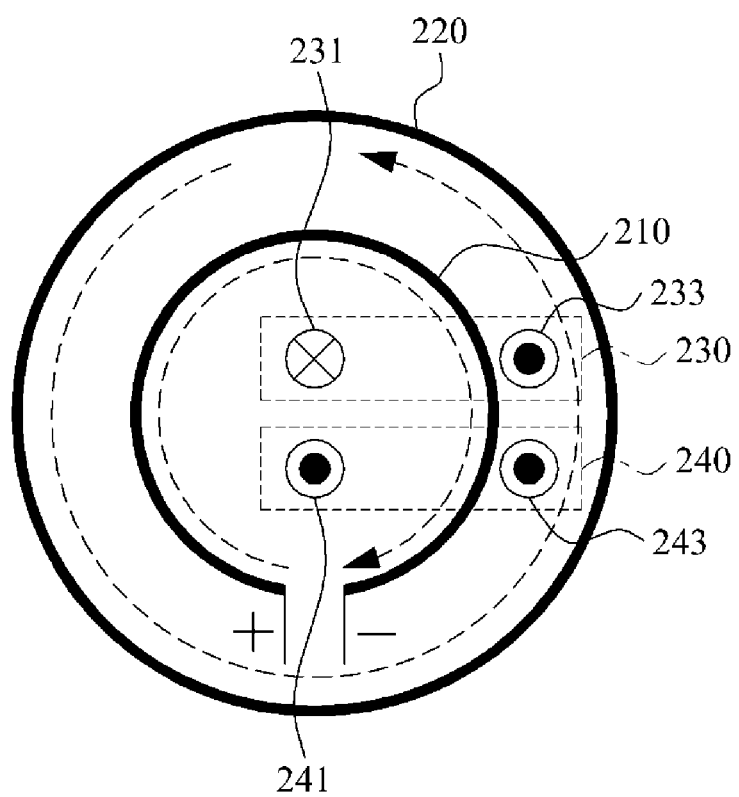

FIGS. 2A and 2B illustrate examples of a distribution of a magnetic field in a resonator and a feeder.

When power is supplied to a resonator through a separate feeder, a magnetic field is generated in both the feeder and the resonator.

A source resonator and a target resonator may each have a double loop structure including an external loop and an internal loop.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 230 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 240 generated by the feeder 210 and the magnetic field 240 generated by the resonator 220 are combined, a strength of a total magnetic field decreases inside the feeder 210, but increases outside the feeder 210. Accordingly, when power is supplied to the resonator 220 via the feeder 210 configured as illustrated in FIG. 2, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Also, an average wireless power transmission efficiency in the resonator 220 may decrease because the wireless power transmission increases when the strength of the total magnetic field increases, and decreases when the strength of the total magnetic field decreases.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Also, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a strength of the total magnetic field increases because a direction 271 of the magnetic field generated by the input current is the same as a direction 273 of the magnetic field generated by the induced current. Conversely, inside the feeder 260, the strength of the total magnetic field decreases because a direction 281 of the magnetic field generated by the input current is opposite to a direction 283 of the magnetic field generated by the induced current. Therefore, the strength of the total magnetic field decreases in the portion of the resonator 250 inside the feeder 260, but decreases in the portion of the resonator 250 outside the feeder 260.

An input impedance may be adjusted by adjusting an internal area of the feeder 260. The input impedance is an impedance viewed in a direction from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance may vary based on a position of a target even if the internal area of the feeder 260 has been adjusted to adjust the input impedance to match an output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
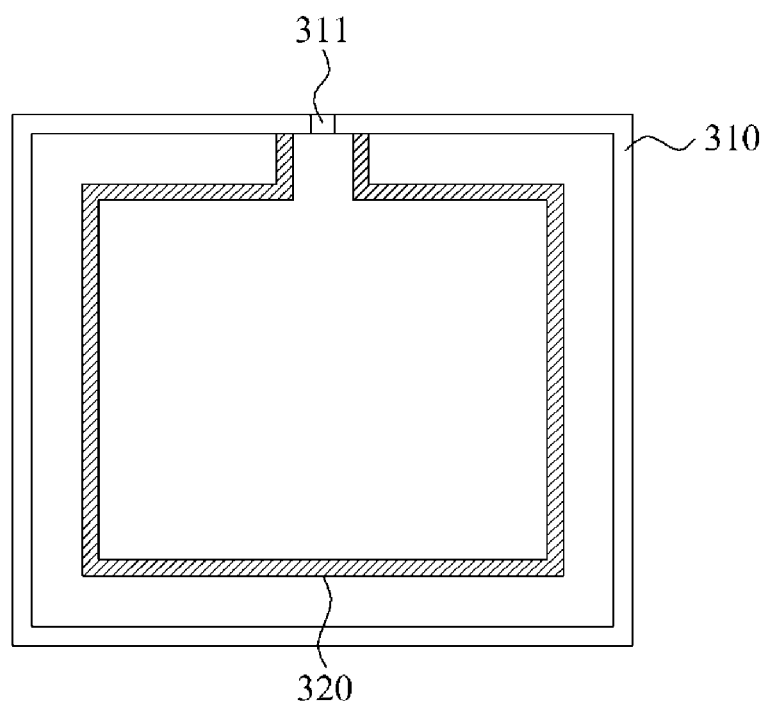
FIGS. 3A and 3B illustrate an example of a configuration of a resonator and a feeder.
Figure 3B:
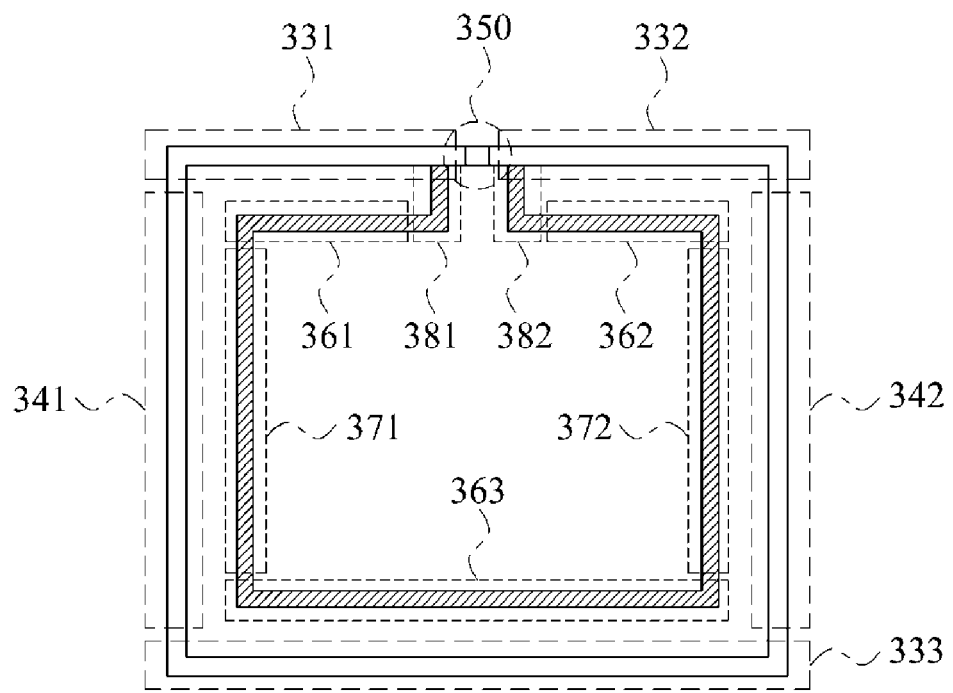

FIGS. 3A and 3B illustrate an example of a configuration of a resonator and a feeder.

Referring to FIG. 3A, a resonator 310 includes a capacitor 311. A feeder 320 is electrically connected to both ends of the capacitor 311.

FIG. 3B illustrates a structure of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As shown in FIG. 3B, the resonator has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 333 and the second signal conducting portion 332.

Also, as shown in FIG. 3B, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 332. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of metamaterial. A metamaterial is a material having an electromagnetic characteristic that is not found in nature, and thus may have an artificially designed structure. All materials existing in nature have a permittivity and a magnetic permeability, and most materials may have a positive permittivity and a positive magnetic permeability.

In the case of most materials, a right-hand rule may be applied to an electric field, a magnetic field, and a Poynting vector, so the corresponding materials may be referred to as right-handed materials (RHMs). However, a metamaterial having a permittivity and/or a magnetic permeability not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and the capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency of the MNG resonator 310 is independent of a physical size of the MNG resonator 310. The resonant frequency of the MNG resonator 310 having the zeroth-order characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator 310 has a relatively high Q-factor when the capacitor 350 a lumped element capacitor, thereby increasing a wireless power transmission efficiency. The Q-factor indicates a level of an ohmic loss or a ratio of a reactance to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, as shown in FIG. 3B, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field inside the resonator 310 to increase inside the feeder 320, and decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 1610 has a circular structure, the feeder 320 may also have a circular structure.

Figure 4A:
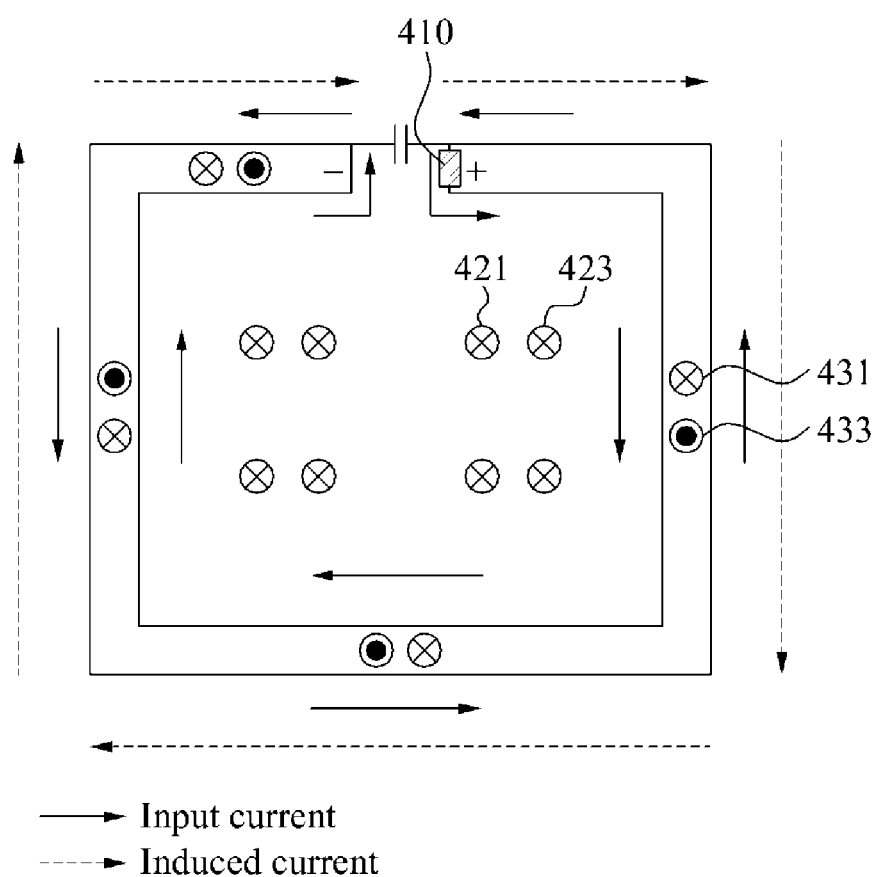
FIG. 4A illustrates an example of a distribution of a magnetic field inside a resonator produced by feeding a feeder.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIGS. 3A and 3B will be used in the following description of FIG. 4A for ease of description.

A feeding operation may be an operation of supplying power to a source resonator in wireless power transmission, or an operation of supplying an AC power to a rectifier in the wireless power transmission. FIG. 4A illustrates a direction of an input current flowing in the feeder 320, and a direction of an induced current induced in the source resonator 310. Additionally, FIG. 4A illustrates a direction of a magnetic field generated by the input current of the feeder 320, and a direction of a magnetic field generated by the induced current of the source resonator 310.

Referring to FIG. 4A, the fifth conductor 381 or the sixth conductor 382 of the feeder 320 of FIG. 3B may be used as an input port 410. In the example in FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 382 of the feeder 320 is connected to the first signal conducting portion 331 of the resonator 310, and the second signal conducting portion 332 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, in a region between the feeder 320 and the resonator 310, a direction 433 of the magnetic field generated by the input current flowing in the feeder 320 is opposite to a direction 431 of a magnetic field generated by the induced current flowing in the source resonator 310. Accordingly, the strength of the total magnetic field decreases in the region between the feeder 320 and the resonator 310.

Typically, in a resonator having a loop structure, a strength of a magnetic field decreases in a center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current of the feeder 320. Since the induced current in the resonator 310 flows in the same direction as the input current in the feeder 320, the strength of the total magnetic field increases inside the feeder 320, and decreases outside the feeder 320. As a result, due to the feeder 320, the strength of the magnetic field increase in the center of the resonator 310 having the loop structure, and decreases near the outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the magnetic field may be constant inside the resonator 310.

A wireless power transmission efficiency of transmitting power from a source resonator to a target resonator is proportional to the strength of the total magnetic field generated in the source resonator. Accordingly, when the strength of the total magnetic field increases in the center of the source resonator, the wireless power transmission efficiency also increases.

Figure 4B:
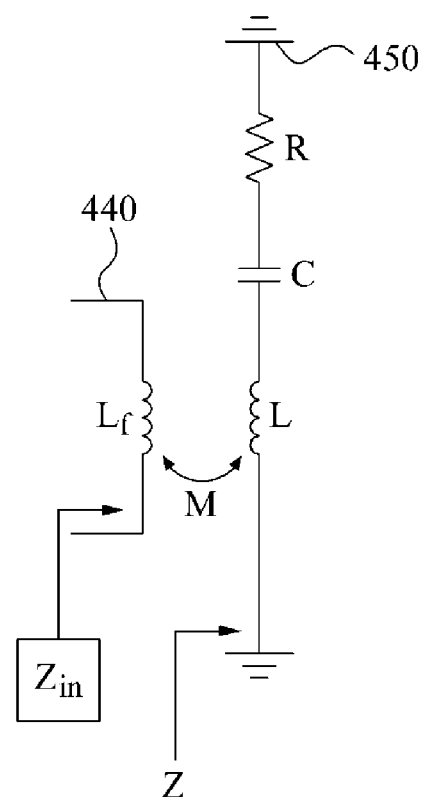
FIG. 4B illustrates an example of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, ω denotes a resonant frequency between the feeder 440 and the resonator 450, and Z denotes an impedance viewed in a direction from the resonator 450 to a target, As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In a target resonator and a feeder of a wireless power reception apparatus, a magnetic field may be distributed as illustrated in FIG. 4A. For example, the target resonator may receive wireless power from a source resonator via magnetic coupling with the source resonator. The received wireless power induces a current in the target resonator. The induced current in the target resonator generates a magnetic field, which induces a current in the feeder. If the target resonator is connected to the feeder as illustrated in FIG. 4A, the induced current in the target resonator will flow in the same direction as the induced current in the feeder. Accordingly, for the reasons discussed above in connection with FIG. 4A, the strength of the total magnetic field will increase inside the feeder, but will decrease in a region between the feeder and the target resonator.

Hereinafter, a "source", a "wireless power transmitter", a "Tx", or a "power transmitting unit (PTU)" may be referred to as a "PTU" for ease of description and conciseness. Also, a "target", a "wireless power receiver", an "Rx", or a "power receiving unit (PRU)" may be referred to as a "PRU". Further, a PTU operating in a master mode may be referred to as a "master device", and a PTU operating in a slave mode may be referred to as a "slave device".

The master device may be network-connected to at least one slave device. The term "network-connection" refers to configuring a network for transmitting and/or receiving data between devices. In a network, the master device may serve as a controller of the slave device, and the slave device may be controlled by the master device.

Figure 5:
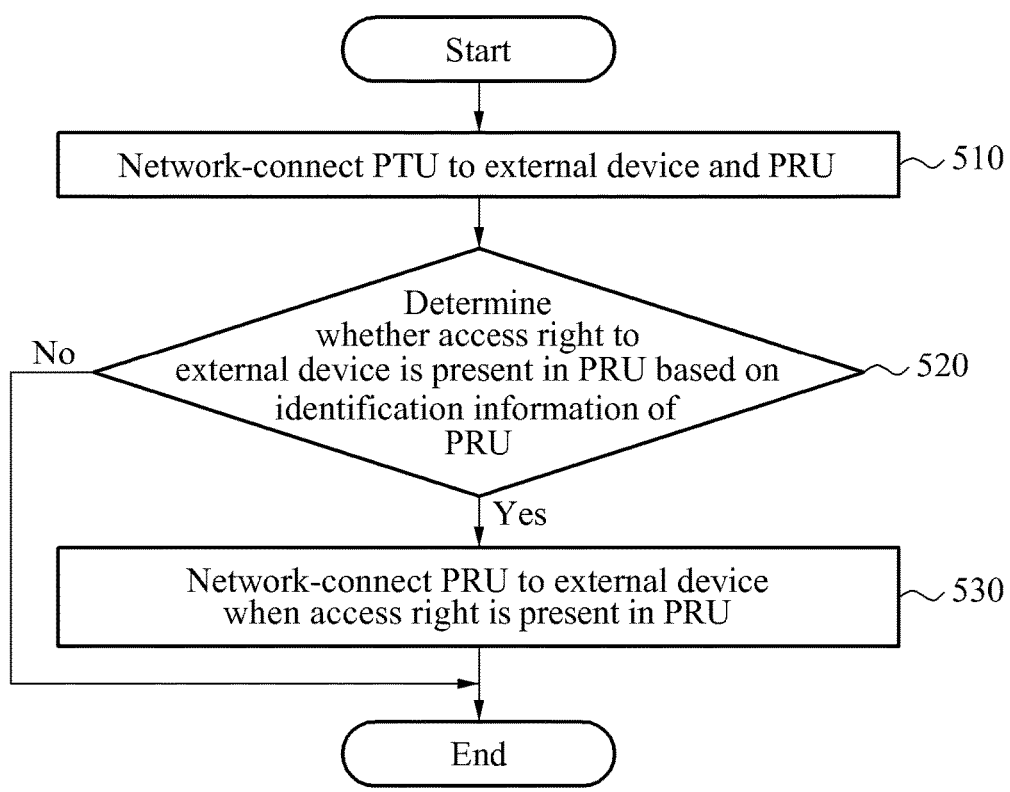
FIG. 5 illustrates an example of an authentication method of a power transmitting unit (PTU).

FIG. 5 illustrates an example of an authentication method of a PTU.

Referring to FIG. 5, in 510, the authentication method of the PTU includes network-connecting the PTU to an external device and a PRU. The PTU may be network-connected to the external device using wired communication or wireless communication. The external device may be any device for configuring a network, such as a laptop computer, a personal computer (PC), a server, or a vehicle. The term "network connection" refers to configuring a network to enable data to be transmitted and/or received between devices in the network. The PTU may perform out-of-band communication when wireless communication is used. The out-of-band communication may be Bluetooth communication, Bluetooth low energy (BLE) communication, or any other type of out-of-band communication known to one of ordinary skill in the art. In one example, the PTU may transmit a search signal to a device performing wired communication or wireless communication with the PTU, and recognize a device responding to the search signal as an external device to be network-connected. In another example, the PTU may be network-connected to the external device by authentication or a log-in. In particular, the PTU may be registered as a device accessing the external device, and be granted an access right by transmitting identification information to the external device.

To be network-connected to the PRU, the PTU may transmit or broadcast a beacon signal. The beacon signal may include a short beacon signal and a long beacon signal. The short beacon signal is a signal for detecting an existence of an object, for example, a PTU or foreign materials, within a predetermined range. The long beacon signal is a signal for waking up the PRU. The long beacon signal may include a wake-up power. A wake-up power is a power that enables the PRU to recognize identification information of the PRU, control the PRU, and operate a transmitter. The PRU receiving the beacon signal is supplied with power from the wake-up power, and transmits an advertisement signal to the PTU. The PTU receiving the advertisement signal transmits a connection request signal to the PRU. When the PTU receives a response signal responding to the connection request signal from the PRU, the PTU network-connects the PTU to the PRU.

Also, in 520, the authentication method of the PTU may include includes determining whether an access right to the external device in present in the PRU based on the identification information of the PRU. For example, the identification information of the PRU may include a unique identifier and a setting identifier of the PRU. The unique identifier is an identifier assigned at a time of manufacturing the PRU, and may include, for example, a product number and a product ID. The setting identifier is an identifier randomly assigned by the PTU, the PRU, or another device.

The PTU may obtain the identification information including either one or both of the unique identifier and the setting identifier of the PRU from the PRU, and determine whether an access right is present in the PRU based on the obtained identification information. The access right is a right required for authentication or a log-in to an external device. For example, the PTU may compare authentication information included in the PTU to the obtained identification information. When the authentication information included in the PTU corresponds to the identification information of the PRU, the PTU determines that the access right is present in the PRU. Conversely, when the authentication information included in the PTU does not correspond to the identification information of the PRU, the PTU determines that the access right is not present in the PRU.

The PTU may feed back, in a visual, audible, or tactile manner, information associated with either one or both of the identification information and the access right of the PRU. For example, when the identification information is received from the PRU, the PTU may provide the identification information to a user via a display included in the PTU. Also, the either one or both of the identification information and the access right of the PRU may be fed back by the PRU or the external device.

In 520, when a PRU in which the access right is not present repeatedly transmits the identification information to the PTU, an overload may occur in the PTU. Accordingly, the PTU may block access by the PRU in which the access right is not present using a lock right. The lock right is a right for blocking access, a data reception, and other operations from an object device. The PTU may receive the identification information a predetermined number of times from the PRU. After determining that an access right is not present in the PRU the predetermined number of pieces of times, the PTU may block further reception of the identification information from the PRU. As a result, the access of the PRU may be blocked, and the PRU may not be network-connected to the external device.

An access right may be granted by a PTU, a PRU, or an external device. The PTU may grant the access right to a unique identifier or a setting identifier of the PRU. The PRU may request the PTU or the external device to grant the access right, or directly generate the setting identifier to transmit to the PTU. The external device may request the PTU to grant the access right to the PRU, or grant the access right directly to the PRU. Detailed descriptions with respect to the granting of the access right will be discussed in greater detail with reference to FIGS. 7A through 7C.

In 530, the authentication method of the PTU includes network-connecting the PRU to the external device when the access right to the external device is determined to be present in the PRU. When the access right is determined to be present in the PRU, the PRU need not undergo an additional authentication procedure to be network-connected to the external device. In particular, when the access right of the PRU is authenticated, the external device may display the identification information of the PRU. When a user selects the displayed identification information, the PRU may be automatically network-connected to the external device. Alternatively, when the access right is authenticated, the PRU may be automatically logged in to the external device.

When the PRU and the external device are network-connected, the PRU and the external device may be directly network-connected with each other. Accordingly, the PRU and the external device may transmit and/or receive data directly to and/or from each other, rather than indirectly via the PTU. For example, when the external device is a vehicle, and the PRU is network-connected to the vehicle, the PRU may transmit a control signal for starting the vehicle, and the vehicle may start its engine based on the control signal.

When the access right to the external device is determined to be not present in the PRU, the PTU blocks a network-connection between the PRU and the external device.

Figure 6:
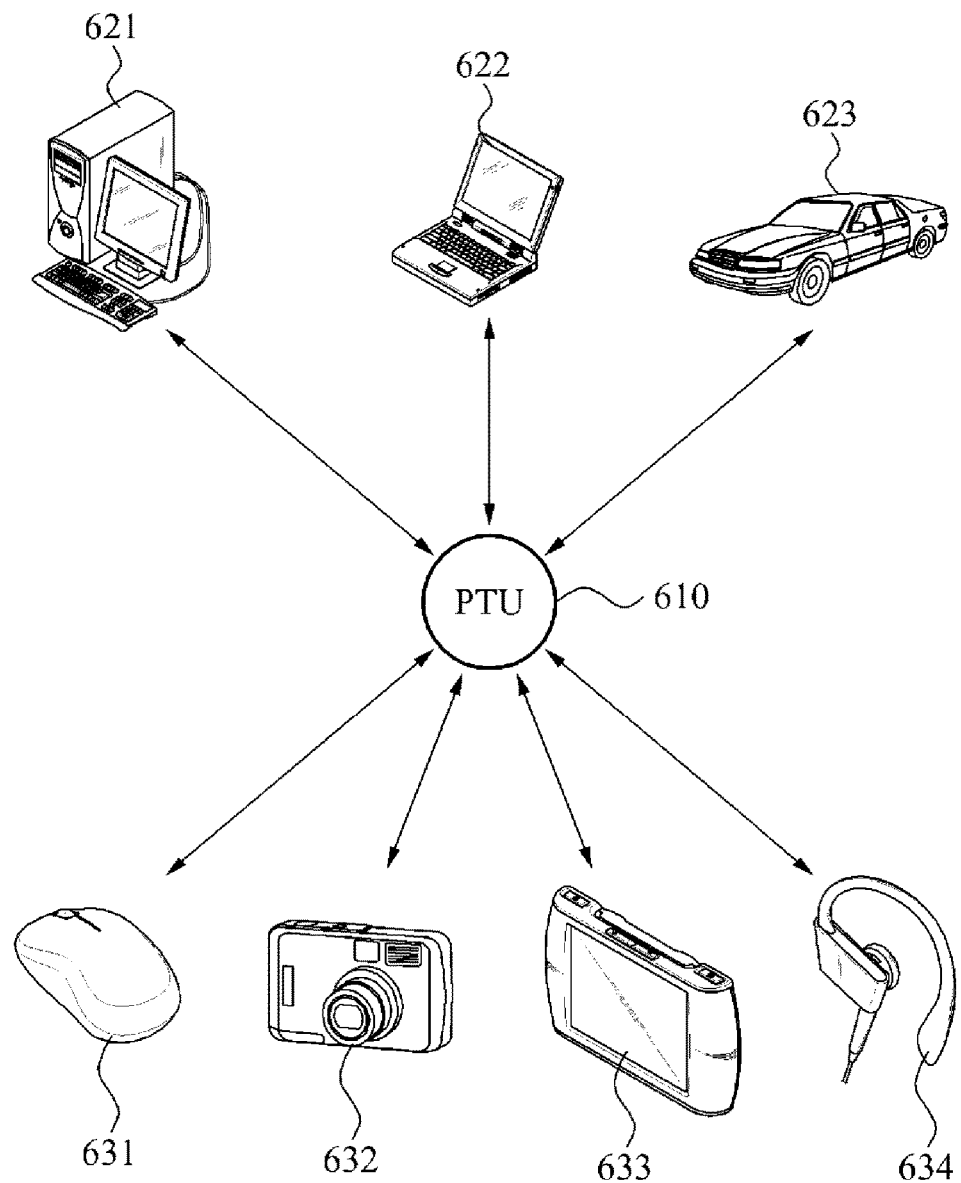
FIG. 6 illustrates an example of a wireless power transmission system.

FIG. 6 illustrates an example of a wireless power transmission system.

Referring to FIG. 6, the wireless power transmission system includes a PTU 610, external devices 621 through 623, and PRUs 631 through 634. The PTU 610 may be network-connected to the external devices 621 through 623. The PTU 610 may transmit power to the PRUs 631 through 634 disposed at a wireless power transmission region of the PTU 610, and be network-connected to the PRUs 631 through 634. For the PRUs 631 through 634 to be network-connected to the external devices 621 through 623, the PRUs 631 through 634 may be directly logged in to the external devices 621 through 623. Further, when interfaces of the PRUs 631 through 634 and the external devices 621 through 623 are incompatible with one another, the PRUs 631 through 634 may not be network-connected to the external devices 621 through 623. To this end, the PTU 610 may determine an existence of an access right to the external devices 621 through 623 in the PRUs 631 through 634, and when the access right is determined to be present, the PTU 610 may network-connect the PRUs 631 through 634 and the external devices 621 through 623 without an additional authentication procedure.

Figure 7A:
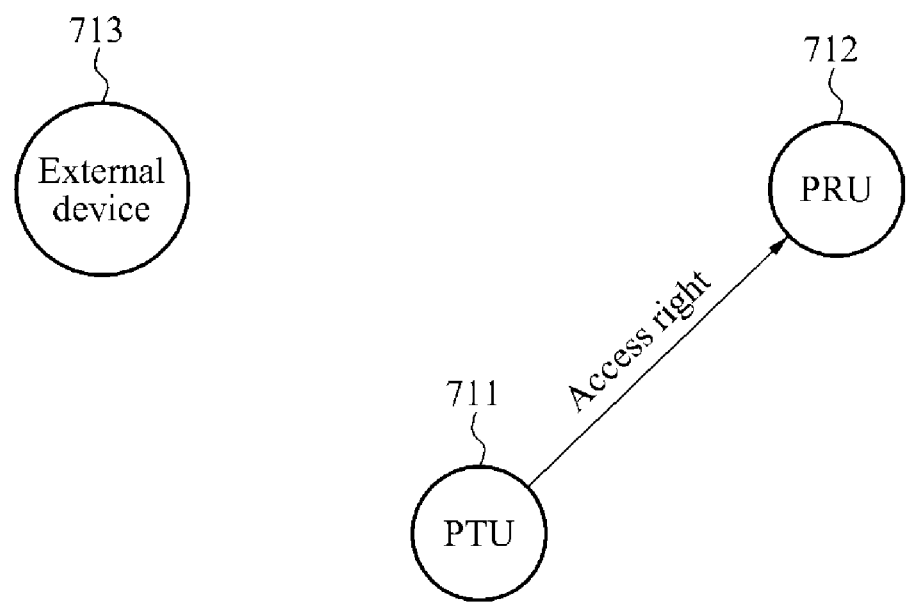
FIGS. 7A through 7C illustrate examples of granting an access right by a PTU, a wireless power receiving unit (PRU), and an external device.
Figure 7B:
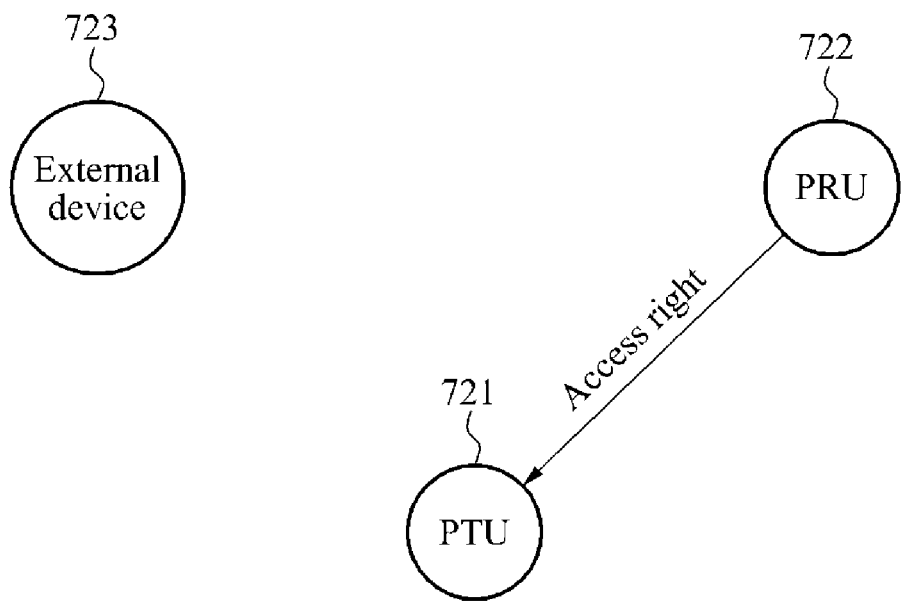
Figure 7C:
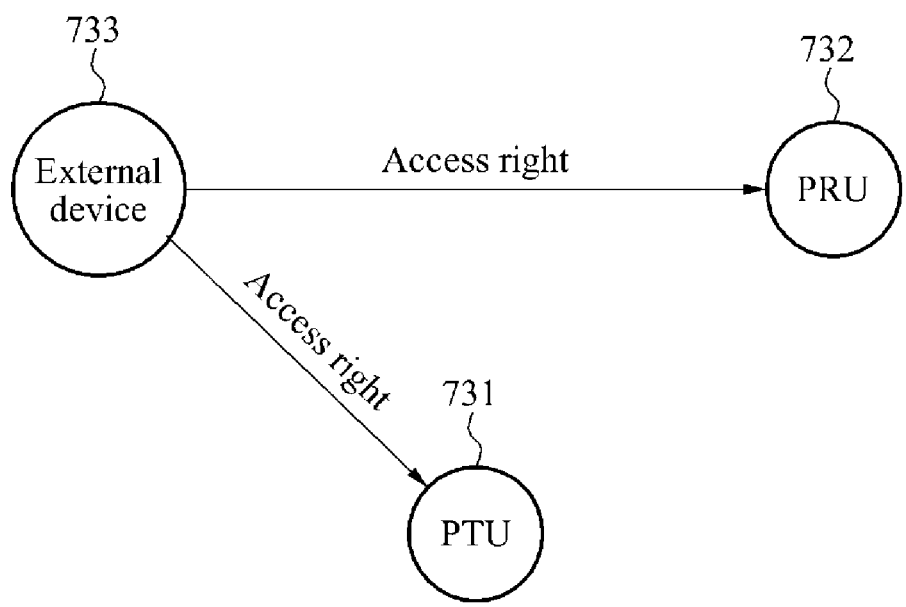

FIGS. 7A through 7C illustrate examples of granting an access right by a PTU, a wireless PRU, and an external device.

Referring to FIG. 7A, a PTU 711 grants an access right to a PRU 712. The PTU 711 may include any one or any combination of a read right, a write right, and a lock right with respect to the PRU 712. The read right is a right for reading or receiving data included in an object device, the write right is a right for providing, granting, storing, or writing data to an object device, and the lock right is a right for blocking access, a data reception, and the like, from an object device.

The PTU 711 may transmit, to the PRU 712, a setting identifier to which the access right is granted. The PTU 711 may store the setting identifier in the PRU 712 using the write right. The PRU 712 in which the setting identifier is stored may be network-connected to an external device 713 by transmitting the setting identifier to the PTU 711 when an access authentication to the PTU 711 is required.

The PTU 711 may include information on the setting identifier in authentication information for determining whether the access right is present in the PRU 712, and determine whether the access right is granted to the PRU 712 by comparing the information on the setting identifier included in the authentication information to the setting identifier of the PRU 712.

In one example, the PTU 711 may obtain a unique identifier of the PRU 712 using the read right. The PTU 711 may generate the setting identifier based on the obtained unique identifier. For example, the PTU 711 may include information on the unique identifier in the setting identifier. Accordingly, the setting identifier may not universally be applicable to other PRUs, and but may be applicable only to the corresponding PRU 712.

Also, the PTU 711 may grant the access right to the obtained unique identifier. Therefore, the PTU 711 may determine whether the access right is present in the PRU 712 by obtaining the unique identifier without generating the setting identifier.

Referring to FIG. 7B, an access right may be granted by a PRU 722. The PRU 722 may include any one or any combination of a read right, a write right, and a lock right with respect to the PRU 722. The PRU 722 may request a PTU 721 to grant the access right to the PRU 722. Accordingly, the PTU 721 may transmit, to the PRU 722, a setting identifier to which the access right is granted in response to the request for granting the access right. Also, the PTU 721 may grant the access right to a unique identifier of the PRU 722 in response to the request for granting the access right.

In one example, the PRU 722 may generate the setting identifier. The setting identifier, differing from the setting identifier generated by the PTU 721, may be generated by the PRU 722, to be granted the access right. The PRU 722 may transmit the generated setting identifier to the PTU 721. In response to the reception of the setting identifier, the PTU 721 may grant the access right to the setting identifier. For example, the PTU 721 may include information on the setting identifier generated by the PRU 722 in authentication information for determining whether the access right is present in the PRU 722.

Referring to FIG. 7C, an access right of a PRU 732 may be granted by an external device 733. The external device 733 may include any one or any combination of a read right, a write right, and a lock right with respect to a PTU 731 or the PRU 732.

The external device 733 may request the PTU 731 to grant the access right to the PRU 732. In particular, the external device 733 may transmit information on the PRU 732 for granting the access right to the PTU 731. The PTU 731 that received the request for granting the access right may grant the access right to a unique identifier, or transmit, to the PRU 732, a setting identifier to which the access right is granted as shown in FIG. 7A. Also, the external device 733 may transmit, to the PTU 731, the setting identifier to which the access right of the PRU 732 is granted. The PTU 731 may transmit the received setting identifier to the PRU 732.

In one example, the external device 733 may grant the access right directly to the PRU 732. For example, the external device 733 may transmit, to the PRU 732, the setting identifier to which the access right is granted. Accordingly, the PRU 732 may transmit, to the PTU 731, the setting identifier to which the access right is granted, and access the external device 733. In another example, the external device 733 may grant the access right to the unique identifier of the PRU 732, and the PTU 731 may obtain the unique identifier to which the access right is granted to authenticate the access right of the PRU 732.

Figure 8:
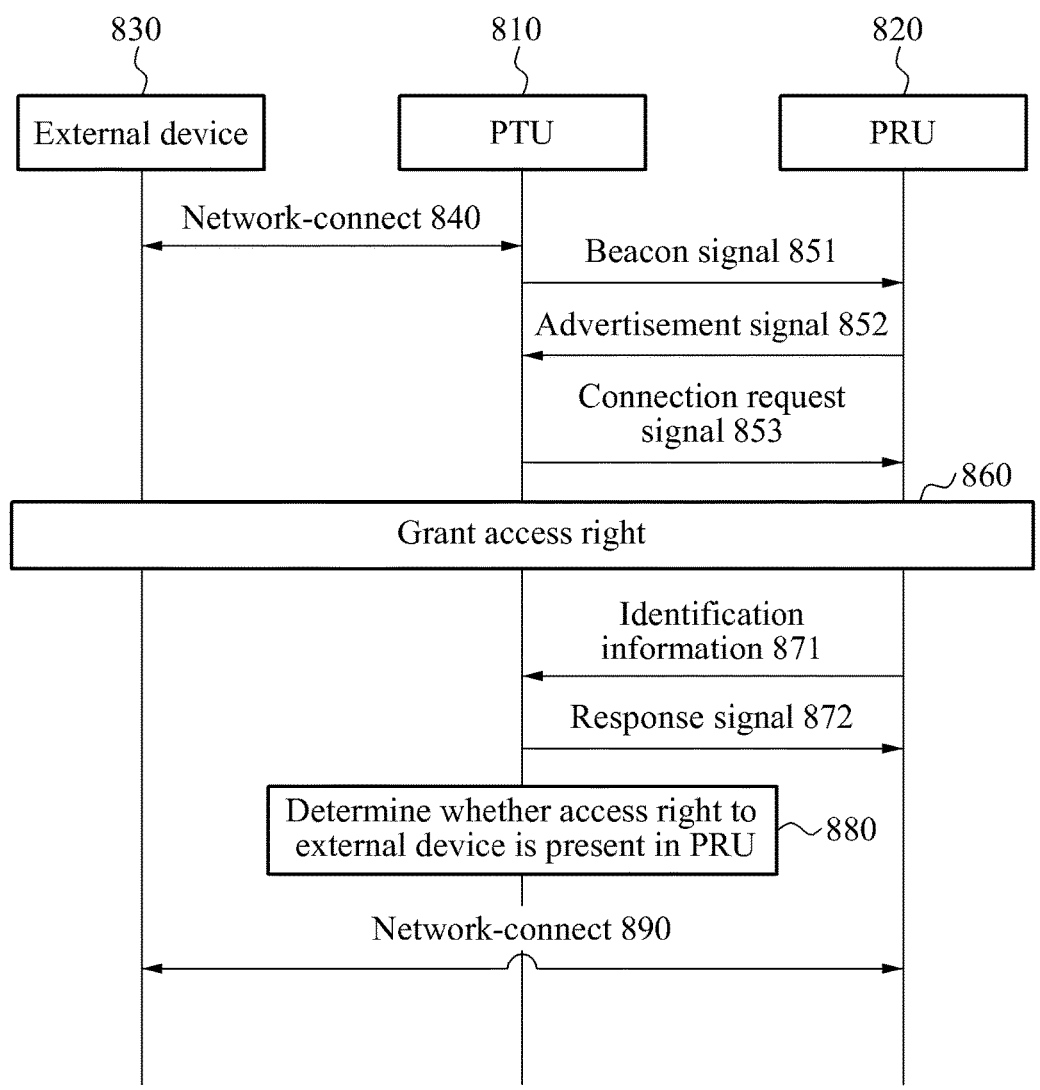
FIG. 8 illustrates an example of a network connection of a wireless power transmission system.

FIG. 8 illustrates an example of a network connection of a wireless power transmission system.

Referring to FIG. 8, in 840, a PTU 810 is network-connected to an external device 830 using wired communication or wireless communication. When the wireless communication is employed, the PTU 810 may perform out-of-band communication, and the out-of-band communication may be Bluetooth communication, BLE communication, or any other type of out-of-band communication known to one of ordinary skill in the art.

The PTU 810 transmits a beacon signal 851 to a PRU 820. Therefore, the PTU 810 may detect that the PRU 820 is present in a wireless power transmission region of the PTU 810, and transmit wake-up power to the PRU 820. A control and communication unit of the PRU 820 may operate using the wake-up power. The PRU 820 transmits an advertisement signal 852 to the PTU 810. In response to the reception of the advertisement signal 852, the PTU 810 transmits a connection request signal 853 to the PRU 820, and when the PTU 810 receives a response responding to the connection request signal 853, the PTU 810 network-connects the PTU 810 to the PRU 820.

In 860, the PTU 810, the PRU 820, or the external device 830 grants an access right to the PRU 820. Although FIG. 8 illustrates that the granting of the access right in 860 is performed after the network-connecting of the PTU 810 to the external device 830 and the PRU 820, the granting of the access right in 860 may be performed before the network-connecting of the PTU 810 to the external device 830 and the PRU 820.

The PTU 810 receives identification information 871 from the PRU 820. The identification information may include a unique identifier and a setting identifier. In response to the reception of the identification information 871, the PTU 810 transmits a response signal 872. The PTU 810 determines whether the access right to the external device 830 is present in the PRU 820 based on the identification information 871. The PTU 810 may verify whether the access right is granted to the unique identifier or the setting identifier of the PRU 820. Also, the PTU 810 may compare authentication information included in the PTU 810 to the obtained identification information. When the authentication information included in the PTU 810 corresponds to the identification information of the PRU 820, the PTU 810 determines that the access right is present in the PRU 820. Conversely, when the authentication information included in the PTU 810 does not correspond to the identification information of the PRU 820, the PTU 810 determines that the access right is not present in the PRU 820.

When the access right is determined to be present in the PRU 820, the PTU 810 network-connects the PRU 820 to the external device 830 in 890. Accordingly, the PRU 820 and the external device 830 may perform direct communication with each other. Conversely, when the access right is determined to be not present in the PRU 820, the PTU 810 blocks access to the external device 830 by the PRU 820.

Figure 9A:
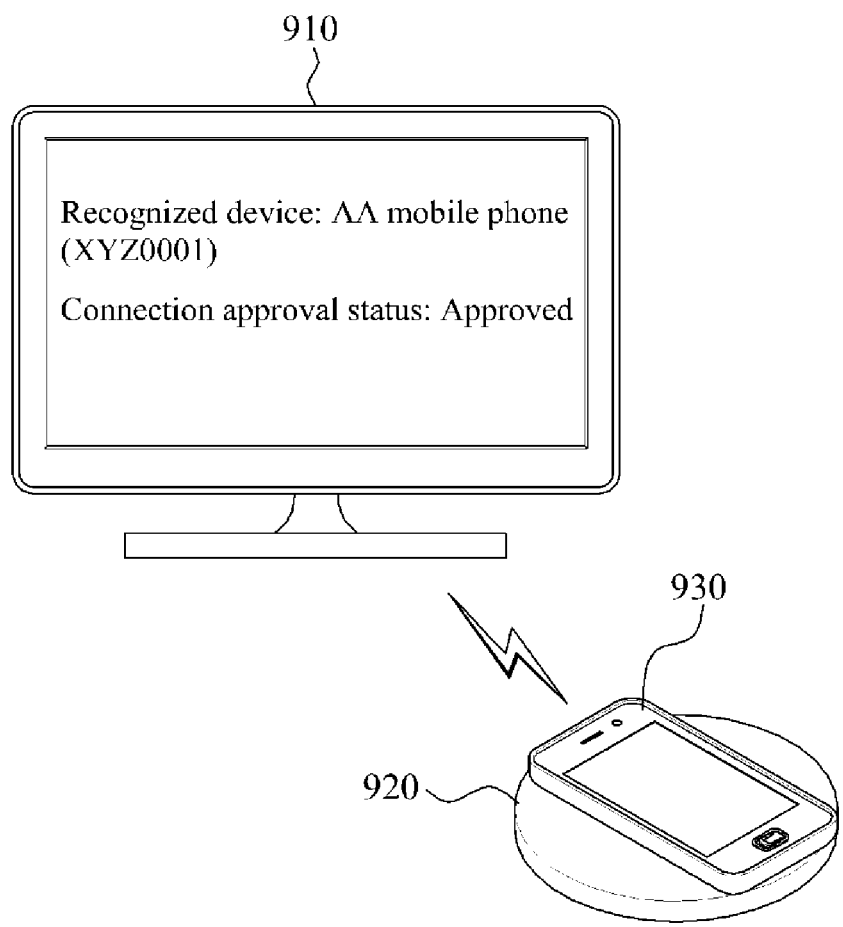
FIGS. 9A and 9B illustrate examples of a wireless power transmission system.
Figure 9B:
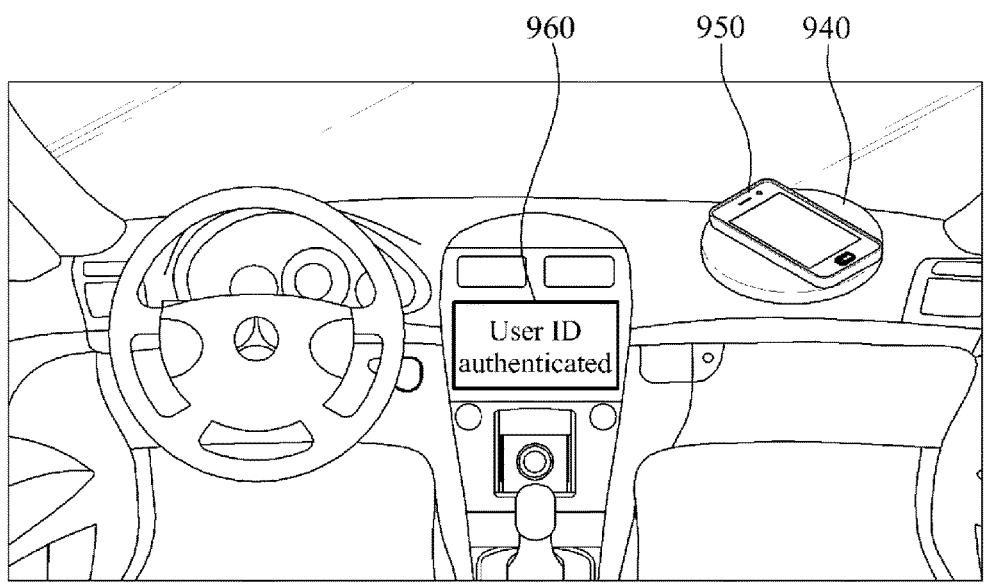

FIGS. 9A and 9B illustrate examples of a wireless power transmission system.

Referring to FIG. 9A, a PTU 920 is network-connected to an external device 910, such as a PC, a TV, or a monitor. When a PRU 930 is disposed within a wireless power transmission region of the PTU 920, the PTU 920 detects the PRU 930 using a beacon signal, receives an advertisement signal, and transmits a connection request signal to be network-connected to the PRU 930. The PTU 920 obtains identification information such as a unique identifier or a setting identifier of the PRU 930 to determine whether an access right to the external device 910 is present in the PRU 930. The external device 910 network-connected to the PTU 920 may feed back, in a visual or audible manner, the identification information of the PRU 930. The PTU 920 determines whether to grant the access right to the identification information of the PRU 930. When the access right is determined to be granted to the identification information, the PTU 920 network-connects the PRU 930 and the external device 910. When the access right is determined not to be granted to the identification information, the PTU 920 blocks a network-connection between the PRU 930 and the external device 910. The external device 910 may feed back, in a visual or audible manner, whether the access right is present in the PRU 930, or whether the PRU 930 is blocked from being network-connected to the external device 910.

Referring to FIG. 9B, a PTU 940 is network-connected to an external device 960, such as a vehicle. The PTU 940 may be present within the external device 960. When a PRU 950 is present on the PTU 940, the PTU 940 and the PRU 950 may be network-connected.

The PTU 940 may determine whether an access right is granted to identification information obtained from the PRU 950. The external device 960 may visually or audibly display the identification information or information on the access right.

When the access right is determined to be granted to the identification information, the PTU 940 network-connects the external device 960 and the PRU 950. For example, when the PRU 950 is network-connected to the external device 960, the external device 960 may start an engine. Conversely, when the access right is determined not to be granted to the identification information, the PTU 940 blocks the network-connection between the PRU 950 and the external device 960.

Figure 10:
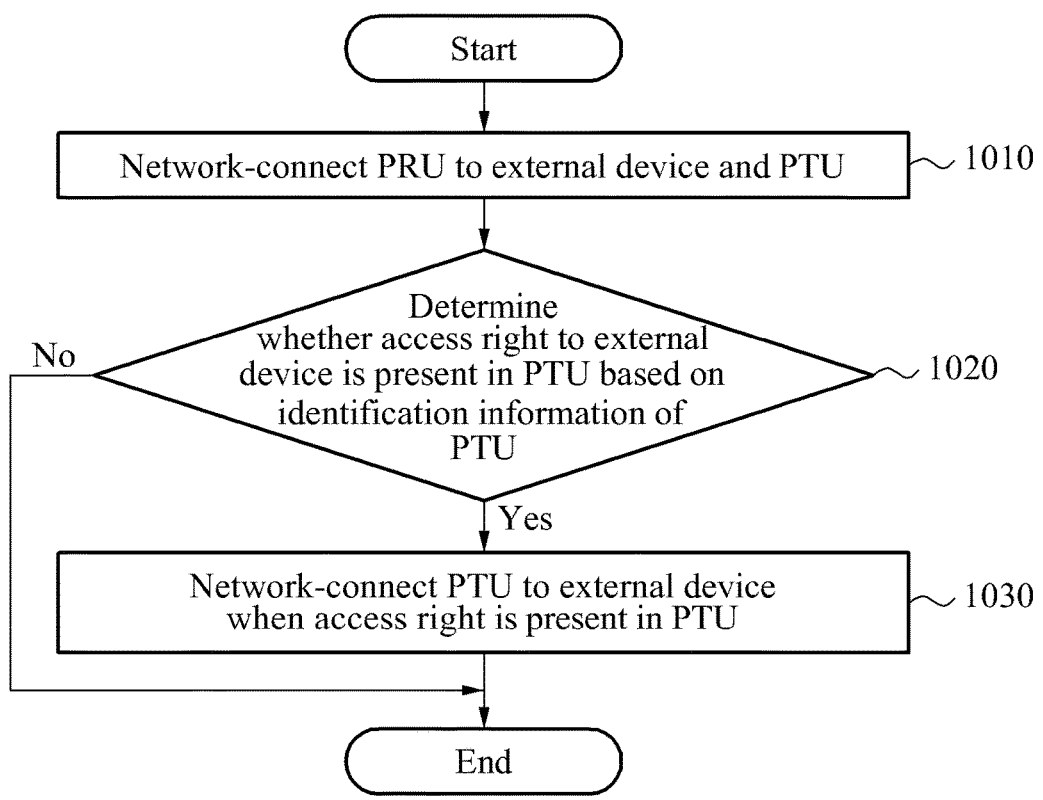
FIG. 10 illustrates an example of an authentication method of a PRU.

FIG. 10 illustrates an example of an authentication method of a PRU.

Referring to FIG. 10, in 1010, the authentication method of the PRU includes network-connecting a PRU to an external device and a PTU. The PRU may be network-connected to the external device using wired communication or wireless communication. Also, the PRU may receive a beacon signal from the PTU, transmit an advertisement signal, and receive a connection request signal to be network-connected to the PTU.

Also, in 1020, the authentication method of the PRU includes determining whether an access right to the external device is present in the PTU based on identification information of the PTU.

Further, in 1030, the authentication method of the PRU includes network-connecting the PTU and the external device when the access right is present in the PTU.

A detailed description the authentication method of the PRU of FIG. 10 will be omitted for conciseness because the descriptions provided with respect to FIGS. 1 through 9B are also applicable to the authentication method of the PRU.

Figure 11:
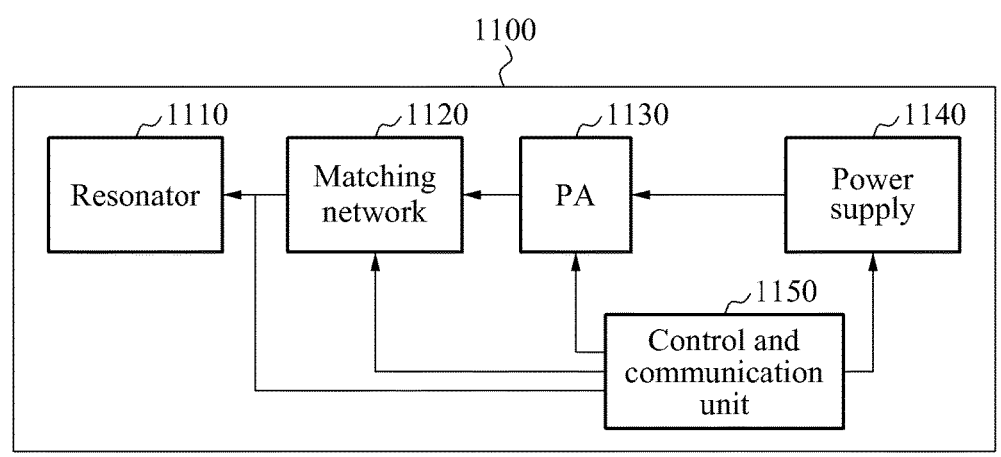
FIG. 11 illustrates an example of a PTU.

FIG. 11 illustrates an example of a PTU 1100 that may be used as the PTUs 610, 711, 721, 731, 810, 920, 940 in FIGS. 6, 7A through 7C, 8, 9A, and 9B.

Referring to FIG. 11, the PTU 1100 includes a resonator 1110, a matching network 1120, a PA (power amplifier) 1130, a power supply 1140, and a control and communication unit 1150.

The resonator 1110 generates a magnetic field coupling with a resonator of a PRU, and transmits a wake-up power.

The matching network 1120 compensates for impedance mismatching with the PRU to achieve optimal under the control of the control and communication unit 1150.

The PA 1130 generates power by converting a DC voltage having a predetermined level to an AC voltage under the control of the control and communication unit 1150.

The power supply 1140 supplies power to the PA 1130 under the control of the control and communication unit 1150.

The control and communication unit 1150 determines whether an access right to an external device is present in the PRU based on identification information of the PRU, and when the access right is determined to be present in the PRU, the control and communication unit 1150 network-connects the PRU to the external device.

Figure 12:
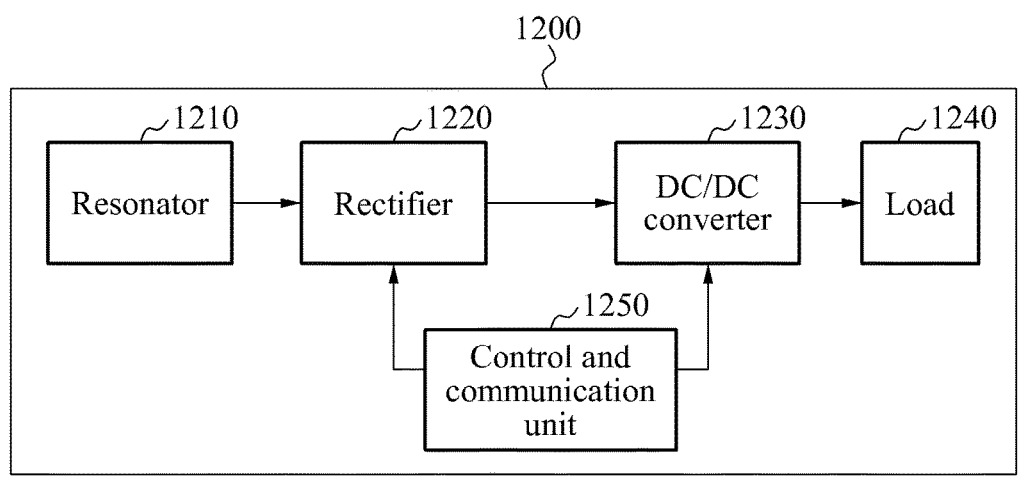
FIG. 12 illustrates an example of a PRU.

FIG. 12 illustrates an example of a PRU 1200 that may be used as PRUs 631 through 634, 712, 722, 732, 820, 930, and 950 in FIGS. 6, 7A through 7C, 8, 9A, and 9B.

Referring to FIG. 12, the PRU 1200 includes a resonator 1210, a rectifier 1220, a DC/DC converter 1230, a load 1240, and a control and communication unit 1250.

The resonator 1210 receives electromagnetic energy from a resonator of a PTU via magnetic coupling with the resonator of the PTU.

The rectifier 1220 generates a DC voltage by rectifying an AC voltage received by the resonator 1210.

The DC/DC converter 1230 adjusts a level of the DC voltage output from the rectifier 1220 to a level required by the load 1240.

The load 1240 receives power from the DC voltage output from the DC/DC converter 1230.

The control and communication unit 1250 determines whether an access right to an external device is present in the PTU based on identification information of the PTU, and when the access right is determined to be present in the PTU, the control and communication unit 1250 network-connects the PTU and the external device.

A detailed description the PTU of FIG. 11 and the PRU of FIG. 12 will be omitted for conciseness because the descriptions provided with respect to FIGS. 1 through 10 are also applicable to the PTU of FIG. 11 and the PRU of FIG. 12.

The Tx controller 114, the communicators 115 and 124, and the Rx controller 125 in FIG. 1 and the control and communication units 1150 and 1250 in FIGS. 11 and 12 that perform the various operations described with respect to FIGS. 2A, 2B, 3A, 3B, 4A, 4B, 5, 6, 7A through 7C, 8, 9A, 9B, and 10-12 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An authentication method of a power transmitting unit (PTU), the authentication method comprising:
   network-connecting to a power receiving unit (PRU);
   determining whether an access right to an external device is present in the PRU based on identification information of the PRU; and
   network-connecting the PRU and the external device in response to determining that the access right is present in the PRU,
   wherein the network-connecting to the PRU comprises transmitting a beacon signal to the PRU, receiving an advertisement signal from the PRU, and transmitting a connection request to the PRU.

2. The authentication method of claim 1, further comprising granting the access right to the PRU.

3. The authentication method of claim 2, wherein the granting of the access right to the PRU comprises transmitting, to the PRU, a setting identifier to which the access right is granted.

4. The authentication method of claim 3, wherein the transmitting of the setting identifier to the PRU comprises:
   obtaining a unique identifier of the PRU; and
   generating the setting identifier based on the unique identifier.

5. The authentication method of claim 3, wherein the transmitting of the setting identifier comprises:
   receiving a request for granting the access right from the PRU; and
   transmitting the setting identifier to the PRU in response to the request for granting the access right.

6. The authentication method of claim 2, wherein the granting of the access right to the PRU comprises:
   obtaining a unique identifier of the PRU; and
   granting the access right to the unique identifier.

7. The authentication method of claim 2, wherein the granting of the access right to the PRU comprises:
   receiving a setting identifier from the PRU; and
   granting the access right to the setting identifier in response to the receiving of the setting identifier.

8. The authentication method of claim 2, wherein the granting of the access right to the PRU comprises:

receiving, from the external device, a request for granting the access right to the PRU; and granting the access right to the PRU in response to the request for granting the access right.

9. The authentication method of claim 2, wherein the granting of the access right to the PRU comprises receiving, from the external device, a setting identifier to which the access right is granted.

10. The authentication method of claim 1, wherein the determining of whether the access right is present in the PRU comprises:

receiving the identification information from the PRU a number of times; and blocking further reception of the identification information from the PRU in response to determining that the access right is not present in the PRU based on the identification information received the number of times.

11. The authentication method of claim 1, wherein the identification information comprises the access right granted by the external device.

12. The authentication method of claim 1, wherein the transmitting of the beacon signal to the PRU comprises transmitting a wake-up power to the PRU.

13. The authentication method of claim 1, wherein the determining of whether the access right is present in the PRU comprises:

receiving either one or both of a unique identifier and a setting identifier from the PRU; and determining whether the access right is present in the either one or both of the unique identifier and the setting identifier.

14. The authentication method of claim 1, wherein the PRU is configured to communicate directly with the external device while the PRU is network-connected to the external device.

15. The authentication method of claim 1, further comprising feeding back, in a visual, audible, or tactile manner, information associated with either one or both of the identification information and the access right of the PRU.

16. A non-transitory computer-readable storage medium storing instructions that, when executed by a processor, cause the processor to perform the authentication method of claim 1.

17. An authentication method of a power receiving unit (PRU), the authentication method comprising:

network-connecting to a power transmitting unit (PTU);

determining whether an access right to an external device is present in the PTU based on identification information of the PTU; and network-connecting the PTU and the external device in response to determining that the access right is present in the PTU, wherein the network-connecting to the PTU comprises receiving a beacon signal from the PTU, transmitting an advertisement signal to the PTU, and receiving a connection request from the PTU.

* * * * *